United States Patent [19]

Herbst

[11] Patent Number: 4,753,286

[45] Date of Patent: Jun. 28, 1988

[54] HEAT EXCHANGER HAVING AN EXCHANGER ELEMENT ARRANGED IN A CASING

[76] Inventor: Donald Herbst, Marienplatz 11, D-1000 Berlin 45, Fed. Rep. of Germany

[21] Appl. No.: 866,341

[22] Filed: May 23, 1986

Related U.S. Application Data

[63] Continuation-in-part of Ser. No. 480,848, Mar. 31, 1983, abandoned.

[30] Foreign Application Priority Data

May 3, 1982 [DE] Fed. Rep. of Germany ....... 3216877

[51] Int. Cl.⁴ ............................................. F28F 7/00
[52] U.S. Cl. ..................................... 165/46; 165/163; 165/905
[58] Field of Search .................. 165/46, 157, 163, 905

[56] References Cited

U.S. PATENT DOCUMENTS

| 2,715,019 | 8/1955 | Walter | 257/241 |
| 3,526,274 | 9/1976 | Gardner | 165/145 |
| 3,805,881 | 4/1974 | Kenrick et al. | 165/1 |
| 3,854,523 | 12/1974 | Smith et al. | 165/1 |

FOREIGN PATENT DOCUMENTS

58-138996 8/1983 Japan .

Primary Examiner—Ira S. Lazarus
Assistant Examiner—Richard R. Cole
Attorney, Agent, or Firm—Basile and Hanlon

[57] ABSTRACT

A heat exchanger element is disclosed having a plurality of bendable plastic tubes comprising one grid folded to result in a multiple layer rectangular grate with crossed tubes which can convey a heat exchange medium.

15 Claims, 6 Drawing Sheets

HEAT EXCHANGER HAVING AN EXCHANGER ELEMENT ARRANGED IN A CASING

RELATED APPLICATIONS

This application is a continuation-in-part of Ser. No. 480,848, filed Mar. 31, 1983 now abandoned.

BACKGROUND OF THE INVENTION

I. Field of the Invention:

The present invention relates to a heat exchanger element arranged in a casing, preferably for a gaseous medium, e.g. air, and a liquid medium, e.g. water.

II. Description of the Prior Art:

In the case of such heat exchangers having an exchanger element, e.g. serving as a heat carrier arranged in a casing, while the medium to be heated flows through the latter, while there is a flow around the exchanger element, it is known to use as the exchanger element a tube assembly made from rigid plastic tubes. Accompanied by reciprocal spacing, the individual plastic tubes fill the cross-section of the casing and the medium to be heated flows through the latter, while also flowing around the plastic tubes (DOS No. 2,617,353). The combination of both ends of the assembly with tube connections forming two opposite walls of the casing through which the medium to be heated flows and in which the individual tube ends are received, while being reciprocally sealed. These tube connections are connected to the inlet and the outlet of the medium flowing through the heat exchanger. The individual tubes of the tube assembly are self-supporting, so that their spacing in the casing is automatically maintained. German Pat. No. 2,012,883 also discloses a tubular heat exchanger in which the tube assembly serving as a heat carrier and filling the cross-section of the casing comprises a mat formed from rigid tubes, whose spacing is maintained and which are interconnected by wires and is wound into a reel. This mat is provided with deflection members used for guiding the medium to be heated.

These known tubular exchangers are so-called cross-flow-type exchanges, in which the medium to be heated is directed at right angles to the tubes and flows around the latter. With regards to their efficiency, such cross-flow-type exchangers occupy a position between parallel flow and counter-current exchanges, in which the media involved in the heat exchanger are moved in the same or opposite directions, the counter-current exchanger having the highest efficiency.

The known tubular heat exchangers have disadvantages regarding their manufacture and installation, as well as their possible uses. The construction and installation of the exchanger element comprising tubes in the casing are complicated and lead to special problems, which are mainly due to the necessary combination of the two tube ends to form tube connections or sockets in the casing wall for the medium flowing through the exchanger element. The combination of the tube ends to form a leak-proof tube connection or socket requires special care and takes a considerable amount of time. The known tubular heat exchangers, with their casing and the exchanger element incorporated therein, form an invariable unit, which must be incorporated into the line carrying the medium to be heated and whose construction is invariably fixed to specific operating conditions and values, so that differently designed heat exchangers must be provided for different operating conditions. In addition, the efficiency of these known tubular heat exchangers does not satisfactorily take into account the present-day requirements for energy saving.

This invention seeks to eliminate the disadvantages and problems linked with the known tubular heat exchangers and to provide an exchanger, which can be inexpensively manufactured and can be adapted with minimum expenditure to different operating conditions and requirements. It is also desirable that the invention provide a problem-free connection of the exchanger element to the medium flowing through it and better operating efficiency.

In connection with a heat exchanger according to the preamble of the main claim, this problem is solved by the features protected in its characterizing part.

The sub-claims represent advantageous further developments of the invention according to the main claim.

SUMMARY OF THE INVENTION

The essential feature of the invention is in the use of an exchanger element comprising a grid formed from flexible plastic tubes crossing one another in a lattice or grating-like manner having a peripherally rectangular shape. The two narrow sides the tubes forming the mat body are combined by their ends into a tubular connection socket by injection molding, which can be easily inserted into the line carrying the medium flowing through the heat exchanger ensuring leak-proof connection of the exchanger element in an optimum simple manner.

The heat exchanger constructed according to the invention can be adapted without difficulty to different operating conditions, due to the fact that the exchanger element can be inserted in the casing as a transversely directed wall. This permits the heat exchanger to function under a variety of operating requirements and conditions by the series arrangement of a plurality of mat bodies. The flexibility of the mat body facilitates the incorporation into the casing and permits length changes resulting from temperature variations, without harmful stresses occurring in the exchanger element.

The grid formed from crossing tubes has a higher efficiency than the tube assembly of the known exchanger elements. On passage through the cross-grating, the medium to be heated is exposed to a greater eddy action. This leads to a better heat transfer and consequently to a better efficiency. When a plurality of mat bodies are connected in series, it is advantageous to use a longer mat body constructed as a multi-layer body by multiple folding about lines directed predetermined angles to its length. In general, this angle can be between about 20° and about 90°. Because the mat body is made from flexible plastic tubes, there is no problem in implementing appropriate folding to bring about a multi-layer body.

As a result of the multiple folding, the efficiency approaches that of the counter-current heat exchangers, so that the overall efficiency is further improved. A further important advantage is that, for example, in air conditioning and ventilation systems, in which pipelines with rectangular cross-section are used for carrying the air, the rectangular pipeline can be used directly as a casing for the exchanger element according to the invention. This leads to a considerable cost saving compared with known exchangers. In the present invention necessary to manufacture a corresponding rectangular exchanger element which is, then, inserted directly into the air-carrying casing. In the supply air line, the exchanger element serves as a heat carrier for heating the air, while in the exhaust air line it serves as a heat absorber for cooling the heated air.

The cross-grating-like grid can be manufactured in various ways, e.g. by entwining the flexible plastic tube to provide a cross-grating-like rectangular shape. They can also be formed from a grid, constituted by a single ribbon of spaced, parallel, longitudinally directed tubes, folded about one or more lines forming an angle of 45° to the longitudinal direction. Additionally, two mats folded in the same way and homologously positioned can be inserted in one another. This necessarily leads to the formation of a mat body comprising two layers, whose tube ends are combined at the narrow sides to give the connection socket according to the invention. A mat formed from longitudinally directed tubes can also be wound into a spiral tube which, by compression, gives the mat body.

BRIEF DESCRIPTION OF THE DRAWINGS

The invention is described in greater detail hereinafter relative to non-limitative embodiments of the heat exchanger, and the attached drawings wherein show.

DESCRIPTION OF THE PREFERRED EMBODIMENT

Figure 1:
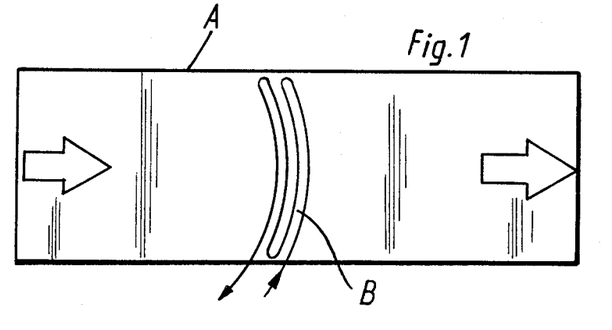
FIG. 1 is a diagrammatic view of the heat exchanger.

FIG. 1 diagrammatically shows part of a conduit A having a rectangular cross-section, such as is used e.g. in air conditioning and ventilation systems. The exchanger element B is placed as an insert in conduit A. Heat exchanger element B has a mat body comprising tubes crossing in a grate-like manner. The mat body is folded back in four layers and is inserted so as to fill the cross-section of conduit A in arcuate manner. The four-layer mat body is made up of flexible plastic tubes crossing one another in grating-like manner, whose diameter is approximately 2 mm. By means of the subsequently described tube connection, water flows in the direction of the arrow through exchanger element B, while the art which is to undergo exchange travels in conduit A in the direction of the large arrow.

In an air conditioning system, the supply air sucked into conduit A during colder weather is heated to an acceptable ambient temperature by exchanger element B which is maintained at an appropriate temperature. At the same time, exhaust air, whose temperature has been further raised in the accommodation areas, loses its heat through an exchanger element, acting as a heat absorber and arranged in the exhaust air line. The thermal energy absorbed by the absorber can be reused on heating the supply air. As the temperature fluctuations occurring are relatively small in the exchanger element B, the resulting length changes of the tubes of the exchanger element are elastically absorbed and compensated by the curved shape.

Figure 2:
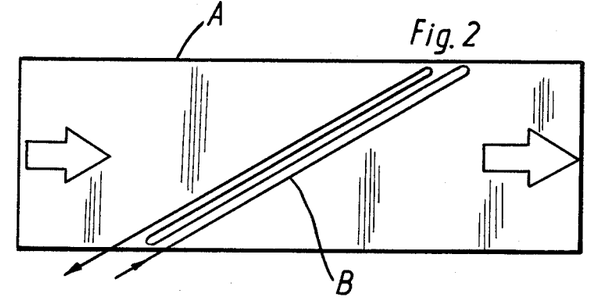
FIG. 2 is a modified embodiment according to FIG. 1.

FIG. 2 corresponds to FIG. 1, with the exception that the exchanger element B is arranged in linearly sloping manner in conduit A.

Figure 3:
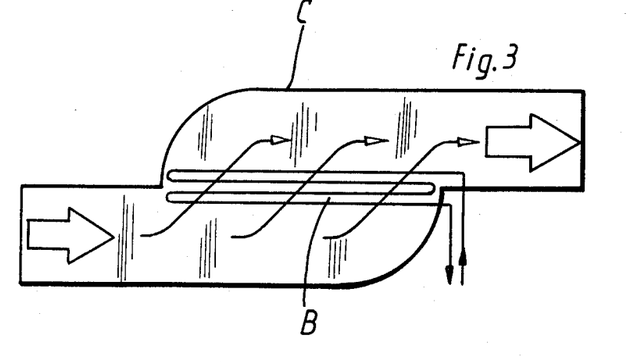
FIG. 3 is a modified embodiment according to FIGS. 1 and 2.

FIG. 3 shows a further modification in which operation takes placed at high temperatures and, due to the resulting major length changes, exchanger element B must be supported to prevent faults by sagging. In this case, exchanger element B is received horizontally positioned on a support (not shown) in a casing part C, which is inserted into conduit A.

Figure 4:
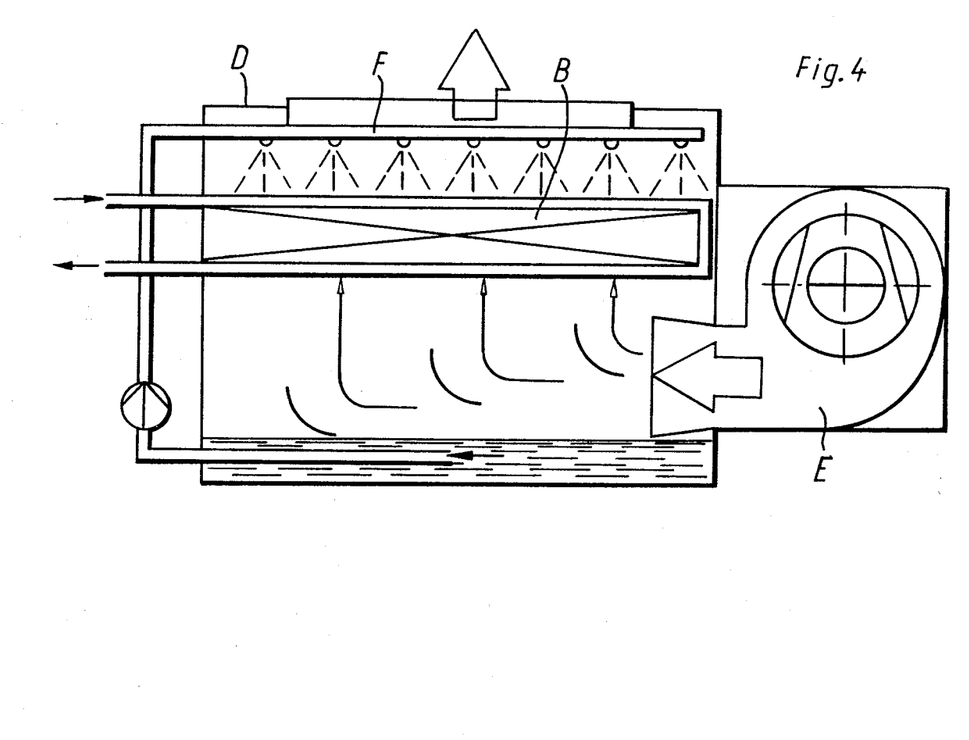
FIG. 4 illustrates the use of the exchanger element in a cooling tower, shown diagrammatically.

FIG. 4 shows the use of the exchanger element C in a so-called cooling tower D. Cold air from a fan E flows from bottom to top through exchanger element B, which can be shaped like that of FIG. 2. At the same time, the cold air is sprayed from the top with water by a line F equipped with a pump (not shown), in order to increase the cooling of the medium carried in exchanger element B by the evaporation coil.

Figure 5:
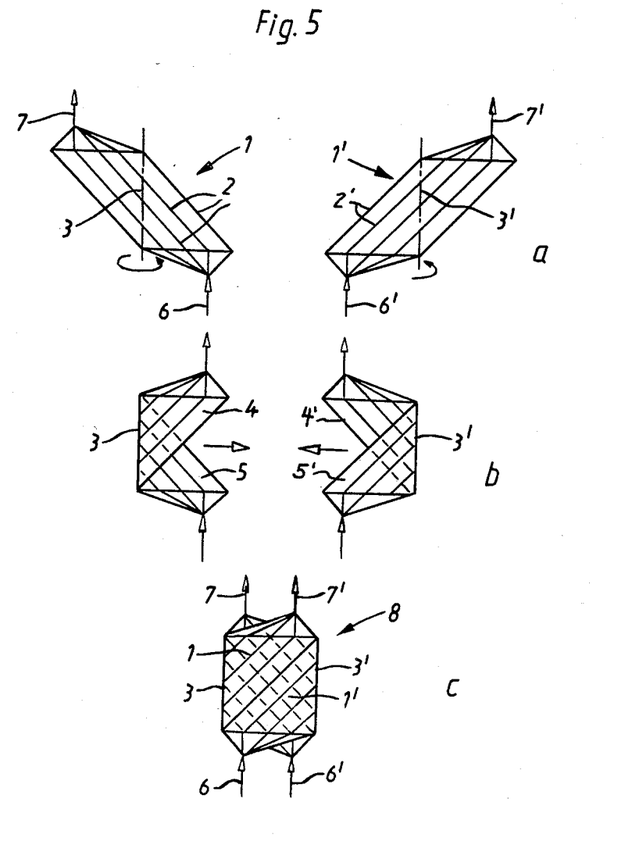
FIGS. 5a–c illustrate the construction of the mat body according to the invention.

FIG. 5 shows a simple possibility of manufacturing the mat body 8 according to the invention formed from flexible plastic tubes. FIG. 5a shows two mats 1, 1' comprising longitudinally directed, spaced-parallel tubes 2, 2'. At the two narrow sides, mats 1, 1' are provided with connections 6, 7, 6', 7' for the supply and exhaust line for the medium. The two mats are folded about the lines 3, 3' approximately at an angle of 45° to tubes 2, 2', as shown in FIG. 1b. After folding, mat 1 or 1' in each case forms two legs 4, 5 or 4', 5', having lines 3 or 3' as a common base line. Legs 4, 5 or 4', 5' overlap one another in an area in the form of a right-angled triangle, in which tubes 2 or 2' cross one another in lattice-like manner in two layers. As shown by FIG. 5b, two mats 1, 1' folded in this way are inserted into one another in the direction of the arrow, leading to a mat body 8 as shown in FIG. 5, which forms a rectangular area constituted by tubes 2, 2' crossing one another in grating-like manner and in two layers. At each narrow side, mat body 8 has two connections 6, 7 or 6', 7' for connection to a medium supply and exhaust line.

Figure 6:
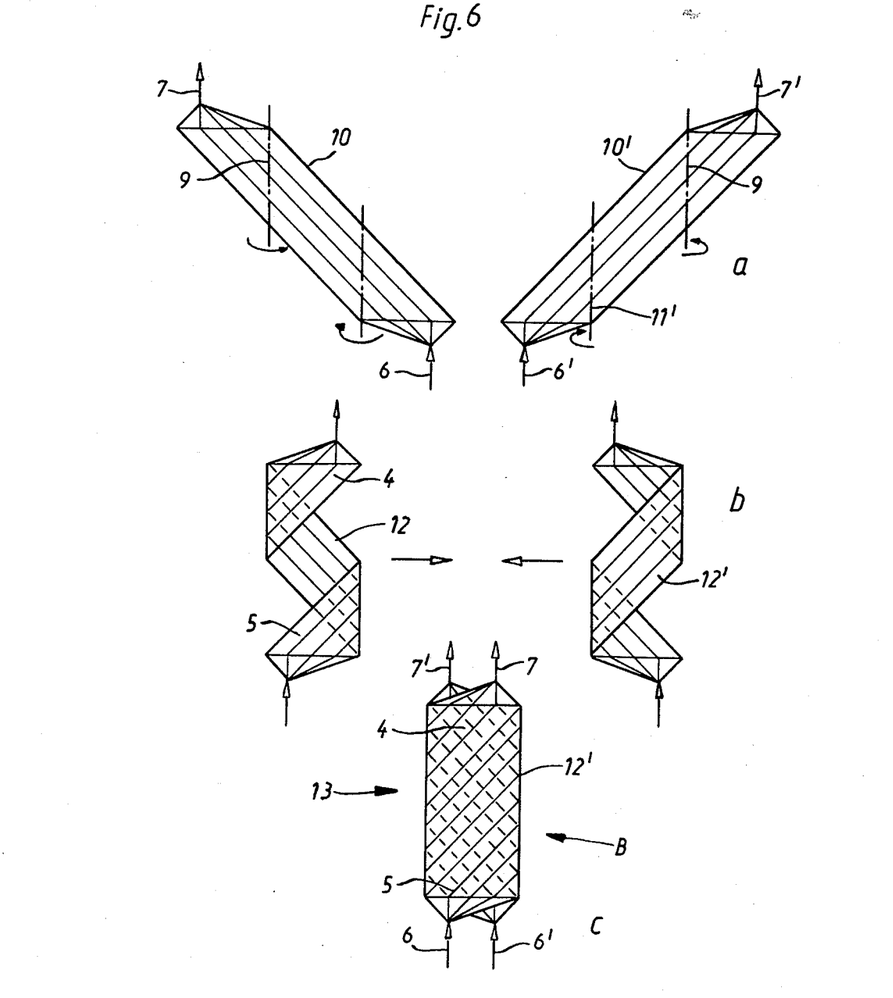
FIGS. 6a–c show a modification according to FIG. 5.

FIG. 6 shows a modified embodiment, for the manufacture of a longer mat, so that it can be folded together in multi-layer form, as shown in FIGS. 1 and 2.

FIG. 6a shows two mats 10, 10', which correspond to mats 1, 1', with the exception that mats 10, 10' are longer. Each of these mats is folded about two parallel, spaced lines 9, 11 or 9', 11' inclined by an angle of 45° to the tubes of the mats and as shown in FIG. 6b. The legs 4, 5 and 4', 5' are spaced apart in such a way that a space 12, 12' is formed between them, which corresponds to the width of mat 10 or 10'. According to FIG. 6b, mats 10, 10' are inserted into one another in the direction of the arrow, giving a mat body 13 having a rectangular area formed by two layers of crossing tubes and as shown in FIG. 6c. Here again, the mat body has at each narrow side two connections 6, 7 or 6', 7'.

For producing a mat body serving as the exchanger element B, it is also possible to form a single mat 1 or 10 according to FIGS. 5 and 6 having a random length by spirally winding to form a tubular body, which can be shaped into a two-layer mat body by flattening and which by folding can subsequently be formed into a multi-layer mat body according to FIGS. 1 or 2, which can be readily used as an exchanger element B, while having on each narrow side a connection for the medium flowing through it.

Figure 7:
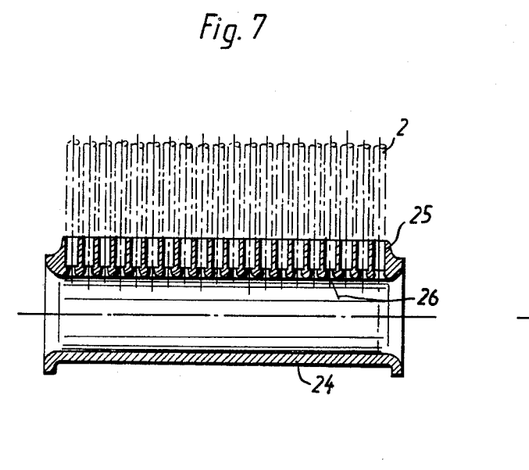
FIG. 7 is a sectional view of the tube connection or socket.
Figure 8:
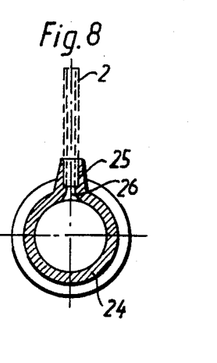
FIG. 8 is a side view according to FIG. 7.
Figure 9:
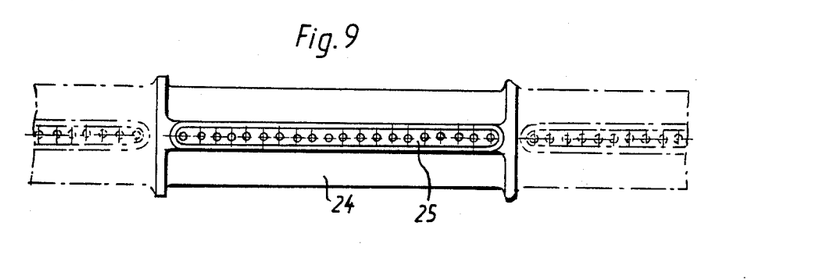
FIG. 9 is a top plan view according to FIG. 7.

FIGS. 7 to 9 show the tube connections or socket 24 receiving the connections 6, 7 of the heater and which have an axially directed, outwardly projecting web 25 sealingly surrounding the row of free tube ends 2. The tube socket 24 with its web 25 is produced by injection molding, while the series-arranged tube ends 2, which are kept sealed during the injection molding process, are inserted in a split mold, provided with a core insert. During the injection molding process, the tube ends 2 are sealingly surrounded in web 25 and, with tube socket 24, are joined into one part. On removing the injection molded tube socket 24 from the not shown mold, the mold part keeping open the tube ends 2 is removed, so that ends 2 are connected to the inner area of tube socket 24 by openings 26 formed in the wall of socket 24 by the injection molding process. This obviates the need for the hitherto necessary bonded or welded connection of tube ends 2 to the tube socket 24.

Figure 10:
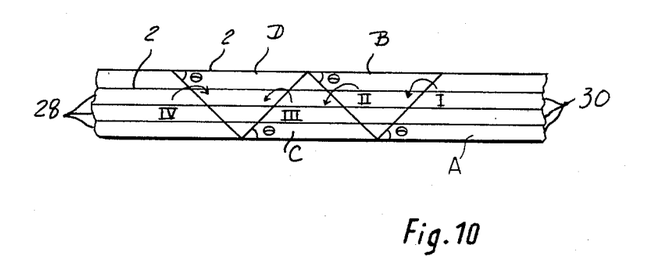
FIG. 10 illustrates the folding sequence to form a two layer mat unit.
Figure 11:
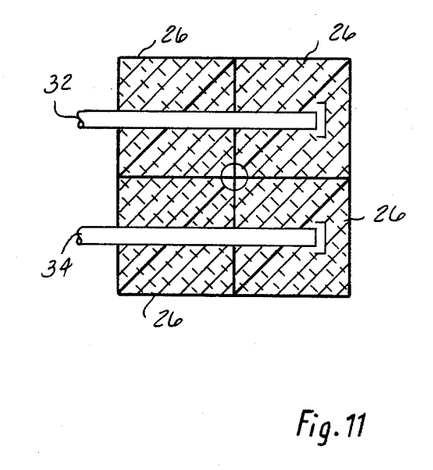
FIG. 11 is a heat exchanger having several of the mat units of FIG. 10.

An alternate embodiment of the present invention is set forth in FIGS. 10 and 11. In this embodiment, longitudinally spaced parallel tubes 2 are folded to form a multi-layer cross-grate 26. Preferably, the grate 26 formed has two layers with tubes configured in a crossed pattern formed by folding the tube along lines I, II, III and IV which form an angle $\theta$ to the longitudinal direction of the tubes. In the alternate embodiment, $\theta$ is an angle between about 40° and 50°, preferably about 45°. Where $\theta$ equals 45°, a cross-grate 26 has an essentially square configuration.

The lines I, II, III and IV divide the longitudinally-spaced parallel tubes 2 into four segments A, B, C and D. Preferably, each segment is a right triangle; the two legs defined by two lines I, II, III and IV and the hypotenuse being an outer edge of the spaced parallel tubes.

In order to make the cross gate 26 of the present invention, segment A is folded along line I to overlay segment B. This introduces a right angle between the tubes 2 in segement A and the contiguous tubes in segment B. Segment B is, then, folded along line II to overly segment C. The hypotenuse of segment A is brought into adjacent engagement with the hypotenuse of segment C. Thus, the spaced parallel tubes 2 in segment C are perpendicular to those in segment B and parallel to those in segment A. Segment C is then folded along line III to overly segment D such that the spaced parallel tubes 2 in segment D are perpendicular to those in overlying segments A and C and parallel to those in segment B. Finally, tube ends 28 are folded along line IV so that tube ends 28 are parallel to tube ends 30.

The grate 26 formed by this method has two layers of perpendicularly disposed contiguous tubes. The cross-grate 26 can be advantageously produced by automated methods.

It is to be understood the positioning of the bends can be varied slightly such that the fold lines I, II, III and IV do not intersect to form right angles. In the event of a central gap being formed in the grate, the adjacent tubes can be pulled toward the center to provide complete coverage.

The multi-layer grate 26 is arranged in a conduit such as conduit A shown in FIGS. 1, 2 and 3. In general, the multi-layer grate 26 is preferably arranged at a right angle to the casing. The tube ends 30 and 28 are connected to tube orifices (not shown); one for the intake and one for the offtake of the liquid heat exchange medium passing therethrough.

The grate 26 may be combined with other similar grates 26 to vary the size of the heat exchanger element as shown in FIG. 11. The grates 26 can be connected by appropriate conduits 32 and 34 to convey the liquid medium to and from the grates 26.

In this manner, heat exchange can progress in an efficient and effective manner as each individual grate 26 to provide that greater quantities of the heat exchange medium are exposed to the gas or liquid to be heated or cooled as it passes through the grates 26.

What is claimed is:

1. A heat exchanger element for use within a casing of a heat exchanger to exchange heat between two separate media, said heat exchanger comprising:
   a plurality of bendable plastic tubes arranged parallel to one another to form a ribbon having a first intake end and a second offtake end, an elongated longitudinal axis, and first and second longtiudinal edges, said ribbon carrying a first fluid medium therethrough; wherein the ribbon is bent such that a first portion thereof has tubes which are superposed upon and are at right angles to the tubes of a second portion of the ribbon to form a double layer cross-grate with crossed tubes media can pass, the crossed tubes connected to at least one positioning socket.

2. The heat exchanger element of claim 1 wherein the ribbon is bent along three bend lines to form an essentially rectangular double layer cross grate, the ribbon comprising:
   bend line forming a 45° angle with the longitudinal axis of the ribbon forming a first and a second ribbon segment wherein the plurality of tubes in the first segment are essentially perpendicular to the tubes in the second segment in overlying relationship;
   a second bend line forming a 45° angle with the longitudinal axis of the ribbon and perpendicular to the first bend line forming a third ribbon segment, such that the tubes in the third ribbon segment are perpendicular to the tubes in the second ribbon segment and are parallel to the tubes in the first segment; in overlying relationship and
   a third bend line forming a 45° angle with the longitudinal axis of the ribbon and perpendicular with the second bend line forming a fourth ribbon segment such that the tubes in the fourth ribbon segment are perpendicular to the tubes in the third ribbon segment and parallel to those in the second segment in overlying relationship.

3. The heat exchanger element of claim 2 wherein the first and third ribbon segments overlay the second and fourth ribbon segments.

4. The heat exchanger element of claim 2 wherein the double layer grids are positioned at a right angle in the casing.

5. The heat exchanger element of claim 2 further comprising:
   a tube positioning socket associated with the first intake end;
   a tube positioning socket associated with the second offtake end; and
   means attached to the sockets for conveying a fluid media to and from the rectangular double layer grid.

6. The heat exchanger according to claim 2 characterized in that the tubes are plastic and have a diameter of approximately 2 mm.

7. In a heat exchanger of the type comprising a casing, an exchanger element mounted in the casing, a first fluid to be heated or cooled passing through passages in the exchanger element, a second fluid passing through the casing and around the exchanger element to exchange heat energy with the first fluid, the invention comprising:

the exchanger element comprsiing a first grid and a second grid;

said first grid comprising a first plurality of spaced parallel tubes connected to a socket, said parallel tubes biased upward and to the side and connected at an upper end to a second socket;

said second grid comprising a second plurality of spaced parallel tubes arranged as a mirror image of said first grid with a lower end connected to said first socket and an upper end connected to said second socket;

said second grid overlaying said first grid with said first plurality of tubes and said second plurality of tubes crossing to form a grating, wherein the spaced plurality of tubes of the first and second grids are longitudinally positioned; and are folded back around at least one line to form an angle of approximately 45° C. with the tubes, and the two grids arranged homologously towards one another are combined to form a two-layer rectangular grate and the tubes are guided in such a way at both ends that their free ends for receiving the respective tube socket are juxtaposed in rows in a plane common to the plane of the rectangular grate.

8. The heat exchanger according to claim 7 characterized in that each tube socket comprises tubular parts sealingly insertable in the supply or exhaust line of the medium supplying exchanger element and made by injection molding and which have an axially directed, outwardly projecting web, receiving the row of free tube ends.

9. The heat exchanger according to claim 8 characterized in that the openings of the free tube ends, which can be kept closed during the injection molding process, are sealingly received in web and issue into the tube member by means of bores arranged in web.

10. In a heat exchanger of the type comprising a casing, an exchanger element mounted in the casing, a first fluid to be heated or cooled passing through passages in the exchanger element, a second fluid passing through the casing and around the exchanger element to exchange heat energy with the first fluid, the invention comprising:

the exchanger element of sufficient length that it can be folded one or more times about one or more lines at right angles to its longitudinal direction, comprising a first grid and a second grid;

said first grid comprising a first plurality of spaced parallel plastic tubes having a diameter about 2 mm connected in series to an associated first socket, said parallel tubes biased upward and to the side and connected at an upper end to an associated second socket;

said second grid comprising a second plurality of spaced parallel plastic tubes having a diameter of about 2 mm arranged as a mirror image of said first grid with a lower end connected in series to an associated first socket and an upper end connected to an associated second socket; and said second grid overlaying said first grid with said first plurality of tubes and said second plurality of tubes in a non-interwoven manner crossing to form a grating.

11. A heat exchanger element for use within a casing of a heat exchanger to exchange heat between two separate media, said heat exchanger comprising:

a plurality of bendable plastic tubes arranged parallel to and in spaced distance from one another forming a ribbon having first intake end and second offtake end, carrying first fluid media through an elongated longitudinal axis, of the ribbon and first and second longitudinal edges; the ribbon being bent to form double layer cross-grate with crossed tubes, the crossed tubes defining a plurality of openings through which a second media can pass, the crossed tubes connected to at least one positioning socket wherein the ribbon is bent along three bend lines to form an essentially rectangular double layer grate, the ribbon comprising:

a bend line forming a 45° angle with the longitudinal axis of the ribbon forming a first and a second ribbon segment wherein the plurality of tubes in the first segment are essentially perpendicular to the tubes in the second segment in overlying relationship;

a second bend line forming a 45° angle with the longitudinal axis of the ribbon and perpendicular to the first bend line forming a third ribbon segment, such that the tubes in the third ribbon segment are perpendicular to the tubes in the second ribbon segment and are parallel to the tubes in the first segment; and a third bend line forming a 45° angle with the longitudinal axis of the ribbon and perpendicular with the second bend line forming a fourth ribbon segment such that the tubes in the fourth ribbon segment are perpendicular to the tubes in the third ribbon segment and parallel to those in the second segment.

12. The heat exchanger element of claim 11 wherein the first and third ribbon segments overlay the second and fourth ribbon segments.

13. The heat exchanger element of claim 11 wherein the double layer grids are positioned at a right angle in the casing.

14. The heat exchanger element of claim 11 further comprising:

a tube socket associated with the first intake end;

a tube socket associated with the second offtake end; and means attached to the sockets for conveying a fluid media to and from the rectangular double layer grid.

15. The heat exchanger according to claim 11 characterized in that the tubes are plastic and have a diameter of approximately 2 mm.

* * * * *